(12) United States Patent
Jeong et al.

(10) Patent No.: US 12,501,500 B2
(45) Date of Patent: Dec. 16, 2025

(54) ELECTRONIC DEVICE AND METHOD FOR REGISTERING EXTERNAL DEVICE USING DEVICE INFORMATION

(71) Applicant: Samsung Electronics Co., Ltd., Suwon-si (KR)

(72) Inventors: Kyungho Jeong, Suwon-si (KR); Sangwoong Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 997 days.

(21) Appl. No.: 17/584,820

(22) Filed: Jan. 26, 2022

(65) Prior Publication Data
US 2022/0330357 A1 Oct. 13, 2022

Related U.S. Application Data

(63) Continuation of application No. PCT/KR2022/000615, filed on Jan. 13, 2022.

(30) Foreign Application Priority Data

Apr. 7, 2021 (KR) ........................ 10-2021-0045310

(51) Int. Cl.
*H04W 76/14* (2018.01)
*G06F 3/04817* (2022.01)
(Continued)

(52) U.S. Cl.
CPC ........ *H04W 76/14* (2018.02); *G06F 3/04817* (2013.01); *H04L 12/2807* (2013.01);
(Continued)

(58) Field of Classification Search
None
See application file for complete search history.

(56) References Cited

U.S. PATENT DOCUMENTS

| 10,181,985 B1 | 1/2019 | Passaglia et al. |
| 10,904,028 B2 | 1/2021 | Jang et al. |

(Continued)

FOREIGN PATENT DOCUMENTS

| KR | 10-2016-0106308 A | 9/2016 |
| KR | 10-1923435 B1 | 11/2018 |

(Continued)

OTHER PUBLICATIONS

International Search Report dated Apr. 22, 2022, issued in International Application No. PCT/KR2022/000615.
(Continued)

*Primary Examiner* — Quang N Nguyen
(74) *Attorney, Agent, or Firm* — Jefferson IP Law, LLP

(57) ABSTRACT

An electronic device is provided. The electronic device includes a display, a communication module, a memory, and a processor configured to receive external device information by establishing a communication connection with a server using the communication module, display a graphic object indicating an external device corresponding to the received external device information on the display, provide a configuration user interface (UI) capable of changing configuration information of the external device based on a user input for the graphic object, store the changed configuration information of the external device based on a user input for the configuration UI, obtain a plurality of device information by searching the external device, establish the communication connection by selecting the device corresponding to the external device information among the plurality of device information, and transmit the stored configuration information to the external device through the communication connection.

20 Claims, 9 Drawing Sheets

(51) Int. Cl.
   *H04L 12/28* (2006.01)
   *H04L 41/0803* (2022.01)
   *H04L 67/75* (2022.01)
   *H04W 4/24* (2018.01)
   *H04W 48/16* (2009.01)
   *H04L 41/084* (2022.01)

(52) U.S. Cl.
   CPC .......... *H04L 41/0803* (2013.01); *H04L 67/75* (2022.05); *H04W 4/24* (2013.01); *H04W 48/16* (2013.01); *H04L 41/084* (2013.01)

(56) References Cited

U.S. PATENT DOCUMENTS

| | | | |
|---|---|---|---|
| 11,570,702 B2 | 1/2023 | Kim et al. | |
| 2013/0214935 A1 | 8/2013 | Kim et al. | |
| 2013/0217359 A1 | 8/2013 | Cherian et al. | |
| 2014/0369232 A1 | 12/2014 | Kim et al. | |
| 2015/0142898 A1* | 5/2015 | Piccolo, III | G08B 25/003 709/204 |
| 2018/0316800 A1* | 11/2018 | Zimmerman | H04W 8/183 |
| 2020/0019529 A1* | 1/2020 | Hanes | G06F 3/1204 |
| 2020/0110438 A1* | 4/2020 | Brubacher | H04L 67/10 |
| 2020/0314743 A1 | 10/2020 | Baki et al. | |
| 2020/0329014 A1* | 10/2020 | Chen | H04L 9/0866 |
| 2021/0068068 A1 | 3/2021 | Lee | |
| 2022/0207451 A1* | 6/2022 | Kaneda | G06Q 10/06315 |
| 2024/0391113 A1* | 11/2024 | Heinzl | B25J 15/0253 |

FOREIGN PATENT DOCUMENTS

| | | |
|---|---|---|
| KR | 10-1980039 B1 | 5/2019 |
| KR | 10-2026696 B1 | 9/2019 |
| KR | 10-2020-0082722 A | 7/2020 |
| KR | 10-2020-0086829 A | 7/2020 |
| KR | 10-2214940 B1 | 2/2021 |
| KR | 10-2021-0026834 A | 3/2021 |

OTHER PUBLICATIONS

Written Opinion dated Apr. 22, 2022, issued in International Application No. PCT/KR2022/000615.
European Search Report dated Jun. 28, 2024, issued in European Application No. 22784749.8.

* cited by examiner

ELECTRONIC DEVICE AND METHOD FOR REGISTERING EXTERNAL DEVICE USING DEVICE INFORMATION

CROSS-REFERENCE TO RELATED APPLICATION(S)

This application is a continuation application, claiming priority under § 365(c), of an International application No. PCT/KR2022/000615, filed on Jan. 13, 2022, which is based on and claims the benefit of a Korean patent application number 10-2021-0045310, filed on Apr. 7, 2021, in the Korean Intellectual Property Office, the disclosure of which is incorporated by reference herein in its entirety.

TECHNICAL FIELD

The disclosure relates to an electronic device. More particularly, the disclosure relates to a method for registering an external device in an internet-of-things (IoT) server using device information.

BACKGROUND ART

With the development of mobile communication technology and processor technology, a portable electronic device (hereinafter, electronic device) can implement various functions in addition to an existing call function. The electronic device may perform a specific function by performing communication connection with various external devices. For example, the electronic device may be communicably connected with a smart phone, an air conditioner, and an air cleaner.

The electronic device may operate an external device based on the communication connection. The electronic device may change the configuration of the external device, or may turn on/off a power of the external device.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device in the related art can register information of an external device and change the configuration thereof only after delivery of the external device is completed. A user is unable to change the configuration of an external device purchased by the user before the delivery thereof, and thus, in offline sales, it is difficult for the user to collect account information, and there are limits in registering the external device in the purchaser's user device.

Further, in case that a plurality of devices are present around the electronic device in the related art, it is difficult to select a specific one of the devices. The user can identify the purchased external device only in case that the user is aware of the entire service set identifier (SSID) of the external device.

Aspects of the disclosure are to address at least the above-mentioned problems and/or disadvantages and to provide at least the advantages described below. Accordingly, an aspect of the disclosure is to provide an efficient registration method in terms of time and cost in case that the electronic device registers information of an external device and changes the configuration thereof before delivery of the external device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display, a communication module, a memory, and a processor operatively connected to the display, the communication module, and the memory, wherein the processor is configured to receive external device information by establishing a communication connection with a server using the communication module, display a graphic object indicating an external device corresponding to the received external device information on the display, provide a configuration user interface (UI) capable of changing configuration information of the external device based on a user input for the graphic object, store the changed configuration information of the external device based on a user input for the configuration UI, obtain a plurality of device information by searching the external device, establish the communication connection by selecting the device corresponding to the external device information among the plurality of device information, and transmit the stored configuration information to the external device through the communication connection.

In accordance with another aspect of the disclosure, a method for registering an external device using device information is provided. The method includes receiving external device information by establishing a communication connection with a server using a communication module, generating and displaying a graphic object indicating an external device corresponding to the received external device information on a display, providing a configuration UI capable of changing configuration information of the external device based on a user input for the graphic object, storing the changed configuration information of the external device based on a user input for the configuration UI, obtaining a plurality of device information by searching the external device, establishing the communication connection by selecting the device corresponding to the external device information among the plurality of device information, and transmitting the stored configuration information to the external device through the communication connection.

In accordance with another aspect of the disclosure, a server to register information of an external device using device information is provided. The server includes a communication module, a memory, and a processor operatively connected to the communication module and the memory, wherein the processor is configured to obtain purchaser's account information, external device information, and delivery information, establish a communication connection with a user device using the account information, transmit the external device information and the delivery information to the user device, and receive configuration information of the external device from the user device and store the configuration information in the memory.

Advantageous Effects of Invention

According to the various embodiments of the disclosure, the electronic device can register information of an external device before delivery of the external device using device information received from an external server, and can change the configuration of the external device based on a user input. A user can optimize the purchased device in a use environment before delivery of the purchased device is completed through configuration of at least one of Wi-Fi, location, and service.

According to the various embodiments of the disclosure, the electronic device can identify an external device among a plurality of devices through comparison of the external device information received from the external server with the external device information received from the external device. Even if the user is not aware of the entire SSID of the external device, the electronic device can identify the external device from the plurality of devices, and can perform communication connection with the external device.

Effects that can be obtained or predicted in various embodiments of the disclosure are to be disclosed directly or explicitly in the detailed description of the embodiments of the disclosure. For example, various effects predicted according to the various embodiments of the disclosure will be disclosed in the following detailed description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
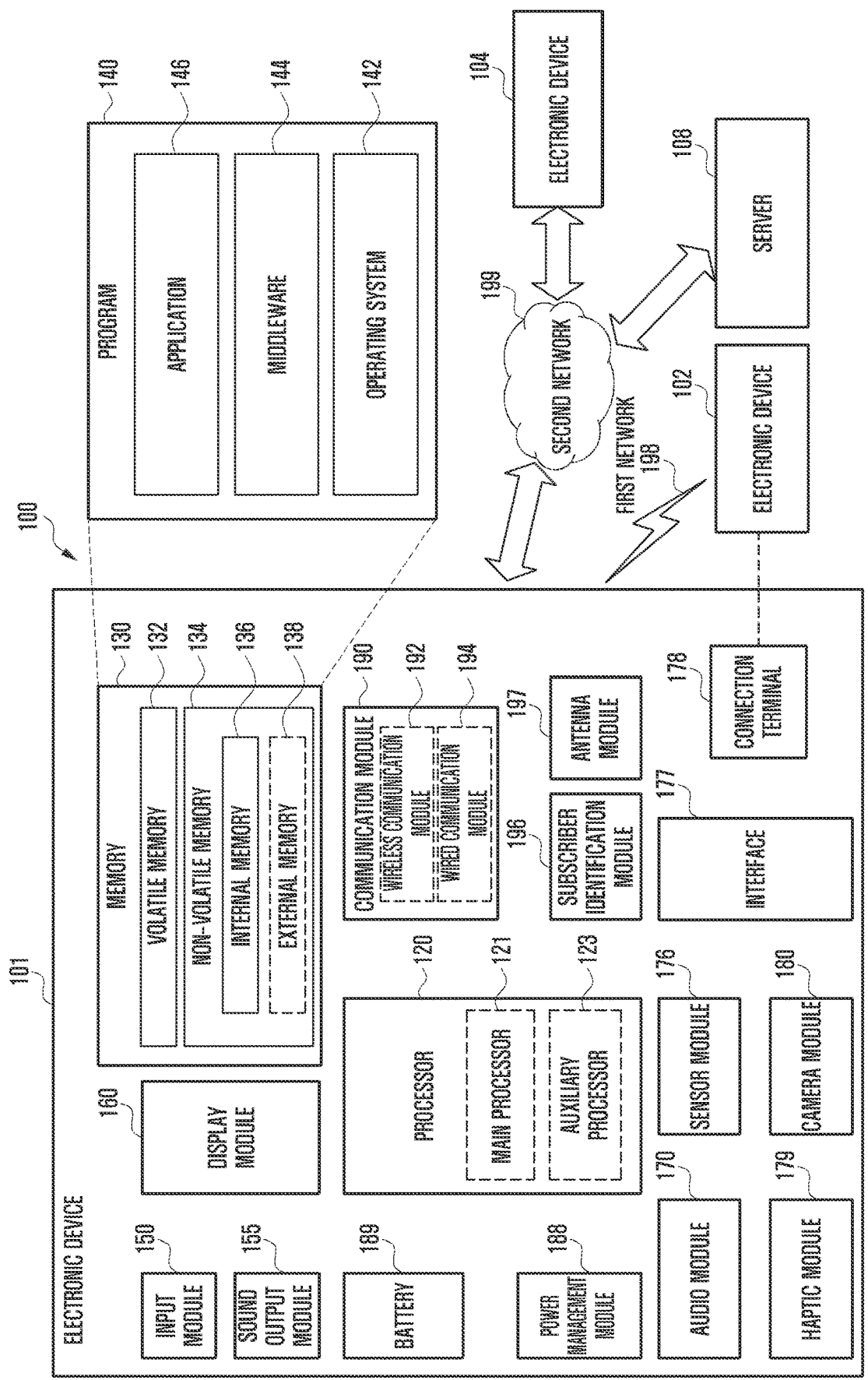
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
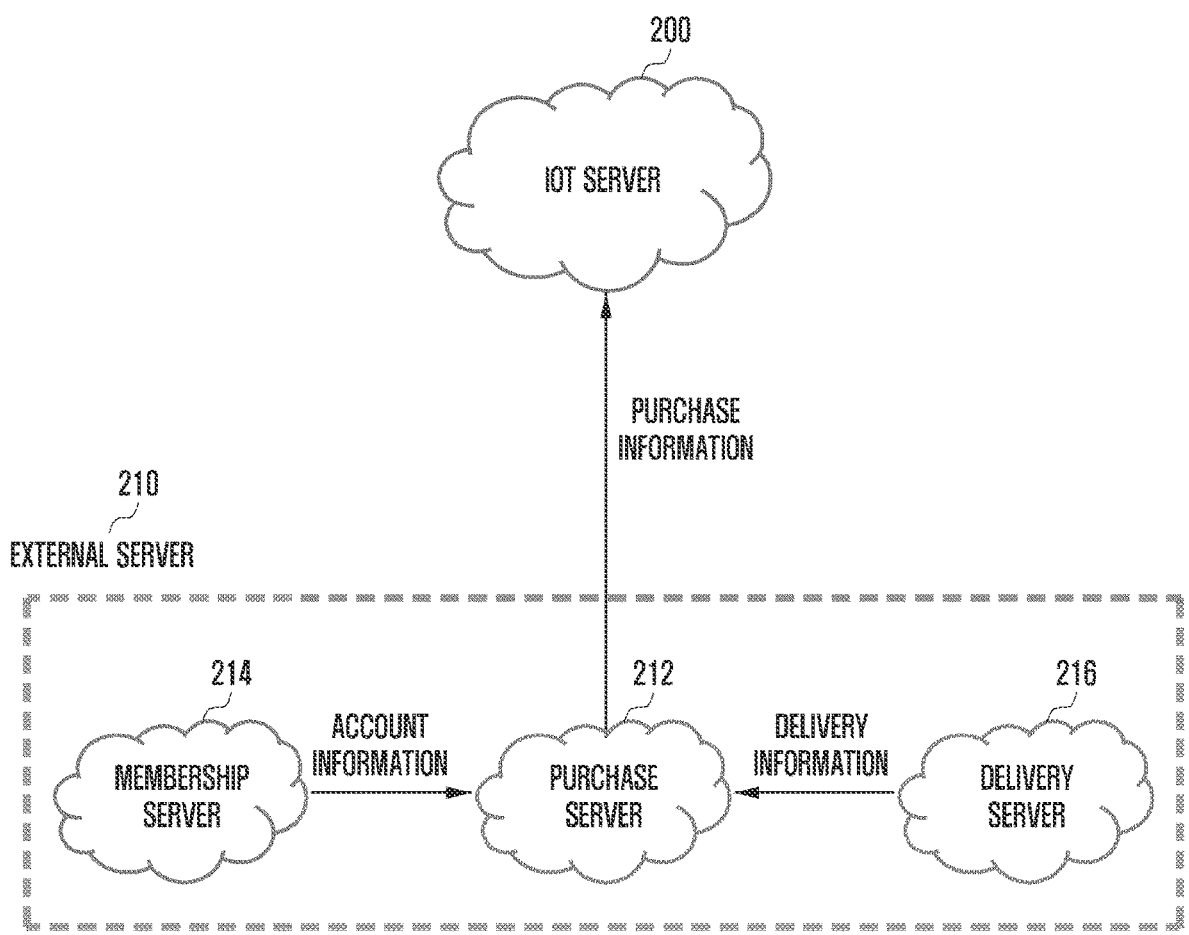
FIG. 2 is a diagram illustrating a relationship between an IoT server and an external server according to an embodiment of the disclosure.

FIG. 2 is a diagram illustrating a relationship between an IoT server and an external server according to an embodiment of the disclosure.

Referring to FIG. 2, an external server 210 may include a membership server 214 and a delivery server 216. Each server may be connected through a wireless network, and may be connected via a central server that manages the server in the center. Each server may be additionally provided with a database, a firewall, and a router. A purchase server 212 may interlock with a server provided in an offline store in which a user has purchased the external device. For example, the purchase server 212 may be connected to the server in the offline store, and may obtain at least one of a type, a price, a model name, or a specification of an external device purchased by a user, a user's name, a phone number, or account information.

The purchase server 212 may obtain account information from the membership server 214. The membership server 214 may store a customer's personal information in its own database. The personal information may include information, for example, such as customer's name, phone number, account information, e-mail, age, and occupation. In case that the account information is unable to be obtained from the server in the offline store, the purchase server 212 may identify the customer's account information by accessing the membership server 214. For example, the purchase server 212 may take the customer's name from the offline store server, enter the customer's name in the database of the membership server 214, and obtain a phone number, e-mail, account information mapped on the name data.

The purchase server 212 may obtain delivery information from the delivery server 216. The delivery information may be information on a delivery state of the external device, and may be transmitted to a user device through the purchase server 212. The delivery information may include, for example, expressions of the simple delivery state, such as ready for shipment, delivery start, or delivery completed, location information on which distribution center the external device is currently located in, and an estimated time of arrival. The user may identify the delivery information transferred to the user device, change configuration information to match an arrival schedule of the external device, or prepare for communication connection. The delivery server 216 may generate an SSID based on unique information of the external device at the time of shipment of the external device. The delivery server 216 may transmit SSID information to the external device, and the SSID of the external device may be transmitted to the user device through the purchase server 212. For example, the delivery server 216 may generate the SSID by combining a serial number given at the time of shipment of the external device with a medium access control (MAC) address. The delivery server 216 may transmit the generated SSID to an IoT server 200 through the purchase server 212.

The IoT server 200 may receive transaction information from the purchase server 212. The IoT server 200 may be connected to the purchase server 212 through a network. The IoT server 200 may be directly connected to the user device, and may transmit the received transaction information to the user device in response to a request from the user device. The transaction information may include account information obtained from the membership server 214 and delivery information obtained from the delivery server 216. The IoT server 200 may obtain the account information by directly establishing a communication connection with the membership server 214 without passing through the purchase server.

The IoT server 200 may store information of various external devices. The external device may be registered in the IoT server 200 using Wi-Fi information provided from the user device. The IoT server 200 may transmit information of the registered external device to the purchase server 212, map the user's account information among the registered information on the personal information, such as a name and a phone number, and transmit the mapped information to the membership server 214. The membership server 214 may receive and store the mapped personal information in a database.

Figure 3:
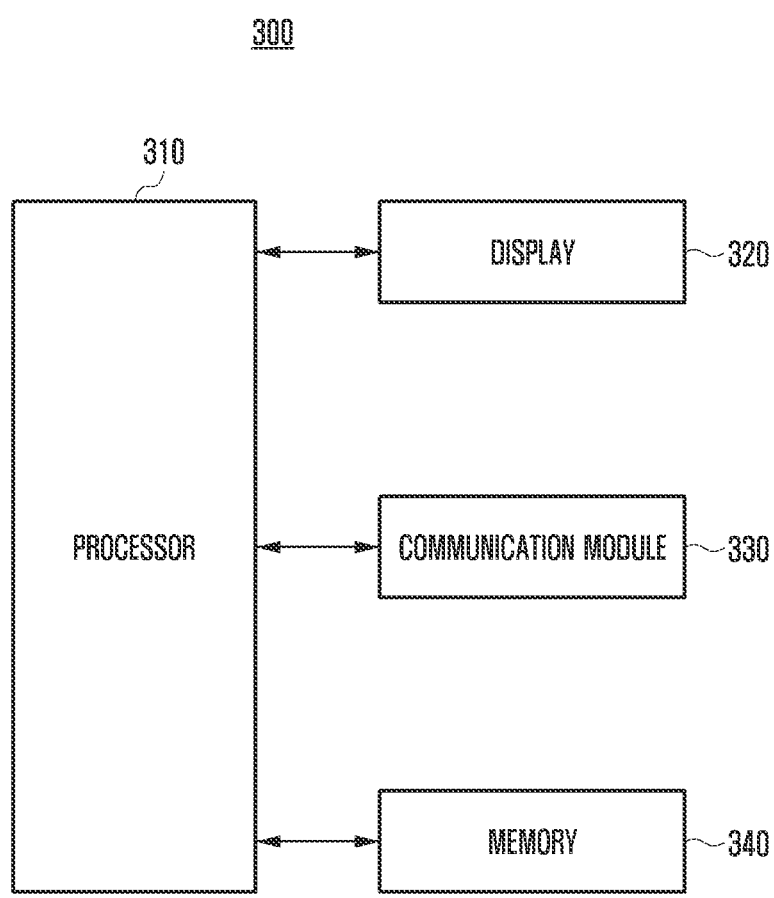
FIG. 3 is a block diagram of an electronic device according to an embodiment of the disclosure.

FIG. 3 is a block diagram of an electronic device according to an embodiment of the disclosure.

Referring to FIG. 3, an electronic device 300 may include a display 320, a communication module 330, a processor 310, and a memory 340. In various embodiments of the disclosure, parts of the illustrated configurations may be omitted or replaced. The electronic device 300 may further include at least parts of the configurations and/or functions of the electronic device 101 of FIG. 1. At least part of the illustrated (or not illustrated) configurations of the electronic device 300 may be connected to each other operatively, functionally, and/or electrically.

The display 320, under the control of the processor 310, may display various images. The display 320 may be implemented by any one of a liquid crystal display (LCD), a light-emitting diode (LED) display, or an organic light-emitting diode (OLED) display, but is not limited thereto. The display 320 may be formed as a touch display for sensing touch and/or proximity touch (or hovering) input using a part of the user's body (e.g., finger) or an input device (e.g., stylus pen). The display 320 may include at least parts of the configurations and/or functions of the display module 160 of FIG. 1. The display 320 may be at least partly flexible, and may be implemented by a foldable display or a rollable display.

The communication module 330, under the control of the processor 310, may communicate with an external device through a wireless network. The communication module 330 may include hardware and software modules for transmitting and receiving data to and from a cellular network (e.g., long term evolution (LTE) network, 5G network, or new radio (NR) network) and a local area network (e.g., Wi-Fi or Bluetooth). The communication module 330 may include at least parts of the configurations and/or functions of the communication module 190 of FIG. 1.

The memory 340 may include a volatile memory (e.g., volatile memory 132 of FIG. 1) and a nonvolatile memory (e.g., nonvolatile memory 134 of FIG. 1), and may temporarily or permanently store various kinds of data. The memory 340 may include at least parts of the configurations and/or functions of the memory 130 of FIG. 1, and may store the program 140 of FIG. 1.

The memory 340 may store various instructions that can be performed by the processor 310. Such instructions may include control commands that can be recognized by the processor 310, such as arithmetic and logical operations, data movement, and input/output.

The processor 310 may be connected to respective constituent elements (e.g., display 320, communication module 330, and memory 340) of the electronic device 300 operatively, functionally, and/or electrically, and may be configured to perform an arithmetic operation or data processing for control and/or communication of the respective constituent elements. The processor 310 may include at least parts of the configurations and/or functions of the processor 120 of FIG. 1.

Although there may not be limitations in performing the arithmetic operation and data processing that can be implemented by the processor 310 on the electronic device 300, explanation will be hereinafter made on various embodiments in which the electronic device 300, before delivery of the external device, changes the configuration of the external device, registers the external device in the IoT server (e.g., IoT server 200 of FIG. 2), and identifies the external device among a plurality of devices. The operations of the processor 310 to be described later may be performed by loading the instructions stored in the memory 340.

The processor 310 may obtain device information from the IoT server. The device information may include at least one of external device information, delivery information, purchaser's name, phone number, and account information. The external device information may include unique information (e.g., SSID) for identifying the external device. The IoT server may receive the transaction information from the purchase server (e.g., purchase server 212 of FIG. 2), and may transmit the device information included in the transaction information to the user device. When receiving the device information from the IoT server, the processor 310 may display a first notification message on the display 320. The processor 310 may generate a virtual device card through reception of a user input for the first notification message.

The processor 310 may generate the virtual device card based on the obtained device information. The processor 310 may display the generated virtual device card on the display 320. The virtual device card may include at least one of a graphic object indicating the external device and a phrase guiding a type and a delivery state of the external device. The processor 310 may separately display an external device being delivered and an external device of which the delivery has been completed. For example, at an upper end of the display 320, an external device being delivered may be displayed, and at a lower end thereof, an external device, of which the delivery and the registration in the IoT server have been completed, and which is currently in use, may be displayed. The processor 310 may change the delivery information that is expressed on the virtual device card depending on the delivery state of the external device. For example, different phrases may be displayed in case that the external device is ready for shipment and in case that the delivery of the external device has been completed.

The processor 310 may operate the external device based on the user input for the virtual device card. After the delivery of the external device is completed, the processor 310 may additionally provide buttons for performing additional functions, such as a power button, a mute button, a Wi-Fi button, and a screen brightness button on the virtual device card. The processor 310 may perform determined functions based on the user input for the respective buttons. For example, after delivery of a television (TV) is completed, the processor 310 may provide a volume control button and a screen brightness control button on the corresponding virtual device card. The user may control the volume and the screen brightness by touching the buttons of the display 320 of the user device. Further, the power button may be provided at an upper right end of the virtual device card, and the power of each of the devices may be turned on/off based on the user input for the power button.

The processor 310 may change the configuration of the external device based on the user input for the virtual device card. The processor 310 may provide various configuration functions necessary for the operation of the external device. The user may configure functions that should be directly configured by the user among the functions being executed in the device on the virtual devices. For example, the configuration of the external device may include configurations of an access point (AP) and a service set identifier (SSID) of the Wi-Fi connectable to the external device, terms and conditions, and a location and a service provider of the external device based on the user input. For example, the user may configure the Wi-Fi by inputting the SSID and the password of the Wi-Fi supported by the external device on the virtual device card. Further, the user may read in advance and approve the terms and conditions for using the external device, and may register in advance the physical location of the external device. The processor 310 may provide a window for changing the configuration of each virtual device card on a separate screen, and may change the configuration based on the user input.

The processor 310 may generate the SSID based on the received external device information. The SSID may include at least one of a user recognition area and a system recognition area. Information on the type of the purchased external device may be included in the user recognition area, and information on an external device version, a manufacturer ID, and a serial number (SN) may be included in the system recognition area.

The processor 310 may filter the Wi-Fi supported by the external device based on the external device information. Among a plurality of pieces of Wi-Fi information being provided in a use environment of the external device, the Wi-Fi information that does not have a frequency band supported by the external device may not be provided. For example, in case that the external device supports only the Wi-Fi having 2.4 GHz frequency, the processor 310 may filter the Wi-Fi information of 5 GHz frequency in the use environment.

The processor 310 may change the configuration of the external device based on voice data of the user. The processor 310 may receive the voice data of the user, and may change the voice data to text data using a speech to text (STT) function. The processor 310 may analyze the changed data, and may change the configuration of the external device.

The processor 310 may establish the communication connection by searching the external device based on the external device information. The processor 310 may generate the SSID using the unique information included in the external device information received from the external device. The unique information may include a unique identifier, such as a serial number of the external device or a MAC address. The delivery server (e.g., delivery server 216 of FIG. 2) may generate the SSID of the external device based on the unique information.

The processor 310 may generate the SSID of the external device based on the external device information. A process in which the processor 310 generates the SSID of the external device based on the external device information may be similar to a process in which the delivery server generates the SSID. For example, the delivery server may generate the SSID by combining the serial number of the external device and the MAC address with each other. The processor 310 may generate the SSID by combining the serial number of the external device and the MAC address with each other based on the device information obtained from the IoT server.

The processor 310 may search a surrounding external device by the SSID. The external devices may have their unique SSIDs, and may broadcast signals including the unique SSIDs. The processor 310 may receive the signals being broadcasted by a plurality of devices, and may search the signal including the same information as the generated SSID based on the external device information. If the signal having the same SSID is found, the processor 310 may establish the communication connection with the external device without any separate user input.

The processor 310 may perform an additional identification procedure when connecting with the external device. If a plurality of external devices are present around the user device, the processor 310 may perform an additional identification procedure in order to identify the external device purchased by the user. The processor 310 may identify the external device through comparison of the generated SSID with the plurality of devices, and may establish the communication connection with the external device of which the additional identification procedure has been completed.

The processor 310 may download a resource necessary for configuration of the external device from the IoT server based on the external device information. The resource may be a UI object necessary for a registration menu for registering the external device in the electronic device. The IoT server may store resources necessary for registration of various external devices, and may transmit a suitable resource in response to a request from the user device. The processor 310 may determine which resource is necessary for the registration of the device, and may request the IoT server to transmit the corresponding resource. At least parts of the resources may differ depending on the type of the external device.

According to various embodiments, the processor 310 may update the IoT server with the information of the external device. The processor 310 may access the IoT server based on the Wi-Fi information input by the user, and may register the external device. According to an embodiment, the processor 310 may update information on the changed configuration of the external device.

Figure 4A:
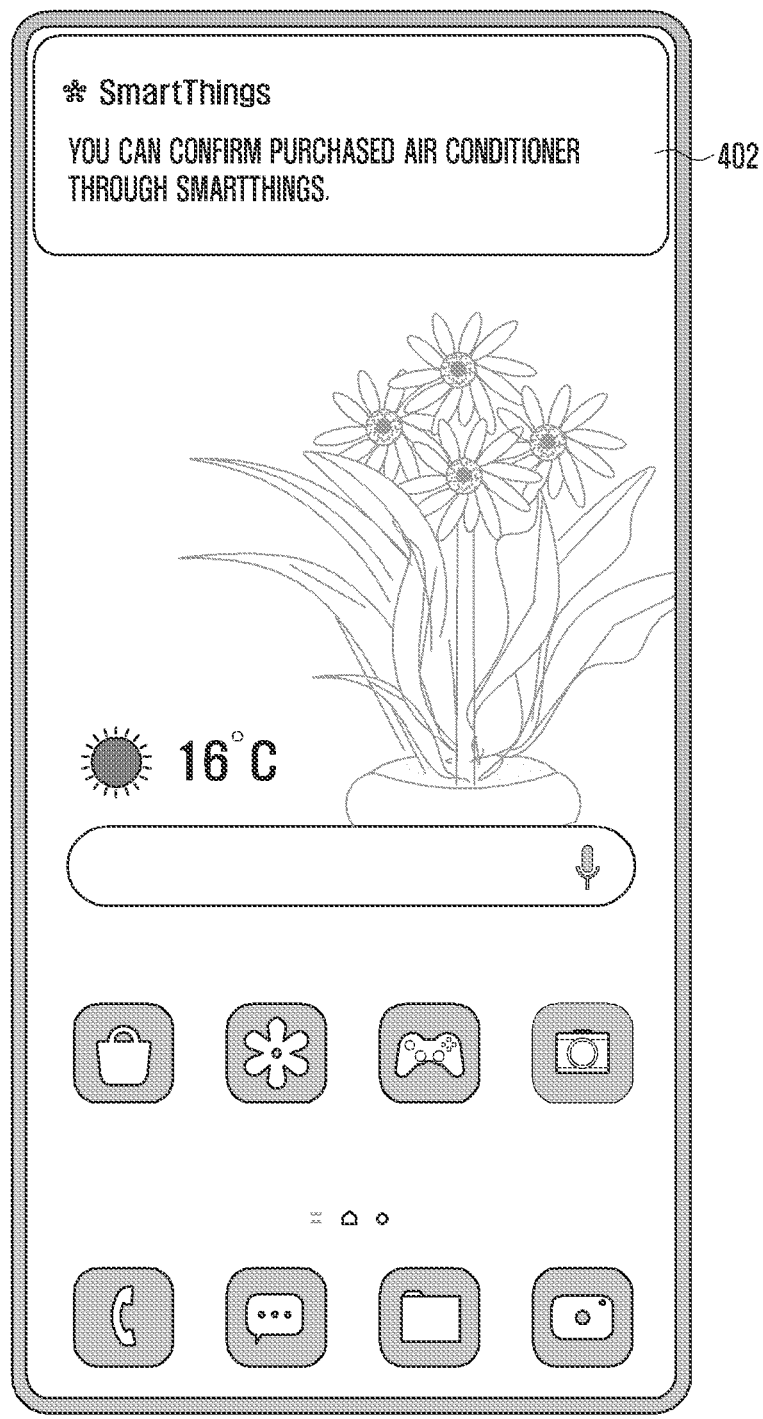
FIG. 4A illustrates a first notification message being displayed in case of purchasing an external device according to an embodiment of the disclosure.

FIG. 4A illustrates a first notification message being displayed in case of purchasing an external device according to an embodiment of the disclosure.

Figure 4B:
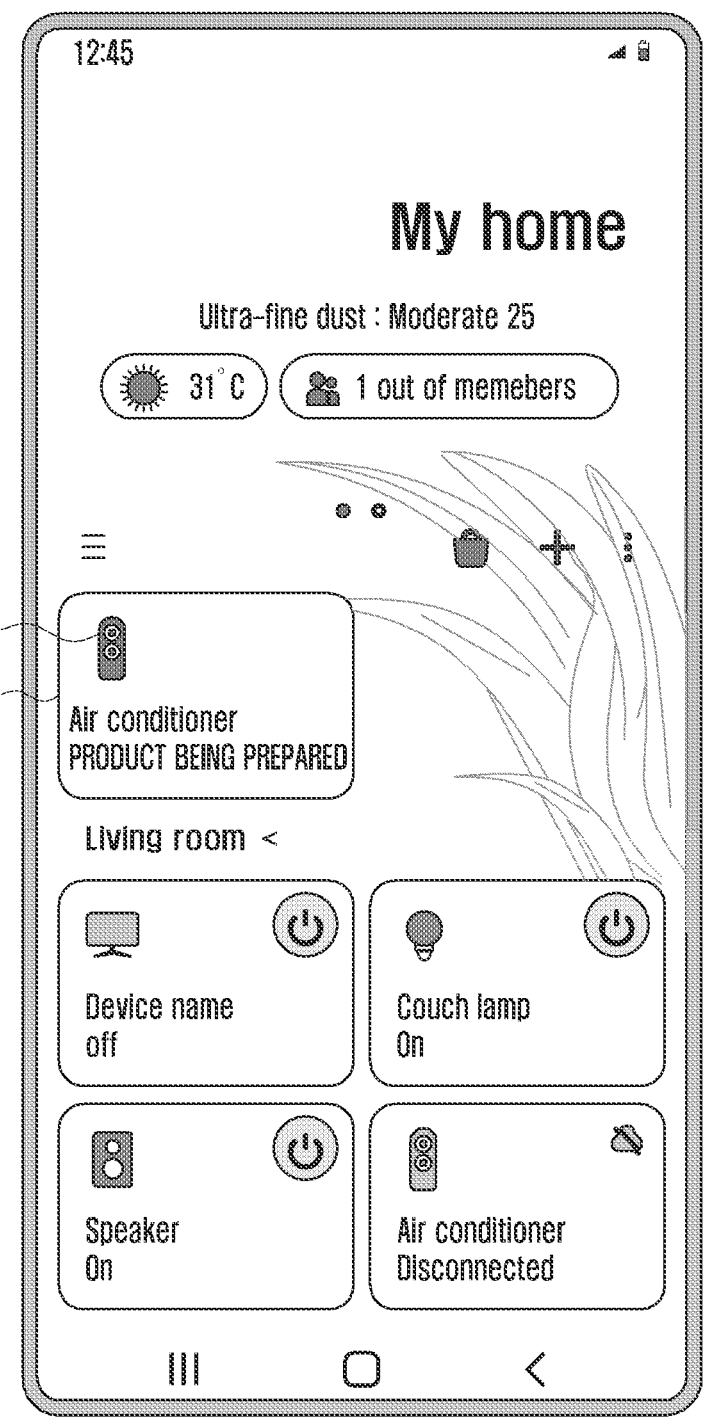
FIG. 4B illustrates an example of a virtual device card displayed on an electronic device according to an embodiment of the disclosure.

FIG. 4B illustrates an example of a virtual device card displayed on an electronic device (e.g., electronic device 300 of FIG. 3) according to an embodiment of the disclosure.

Figure 4C:
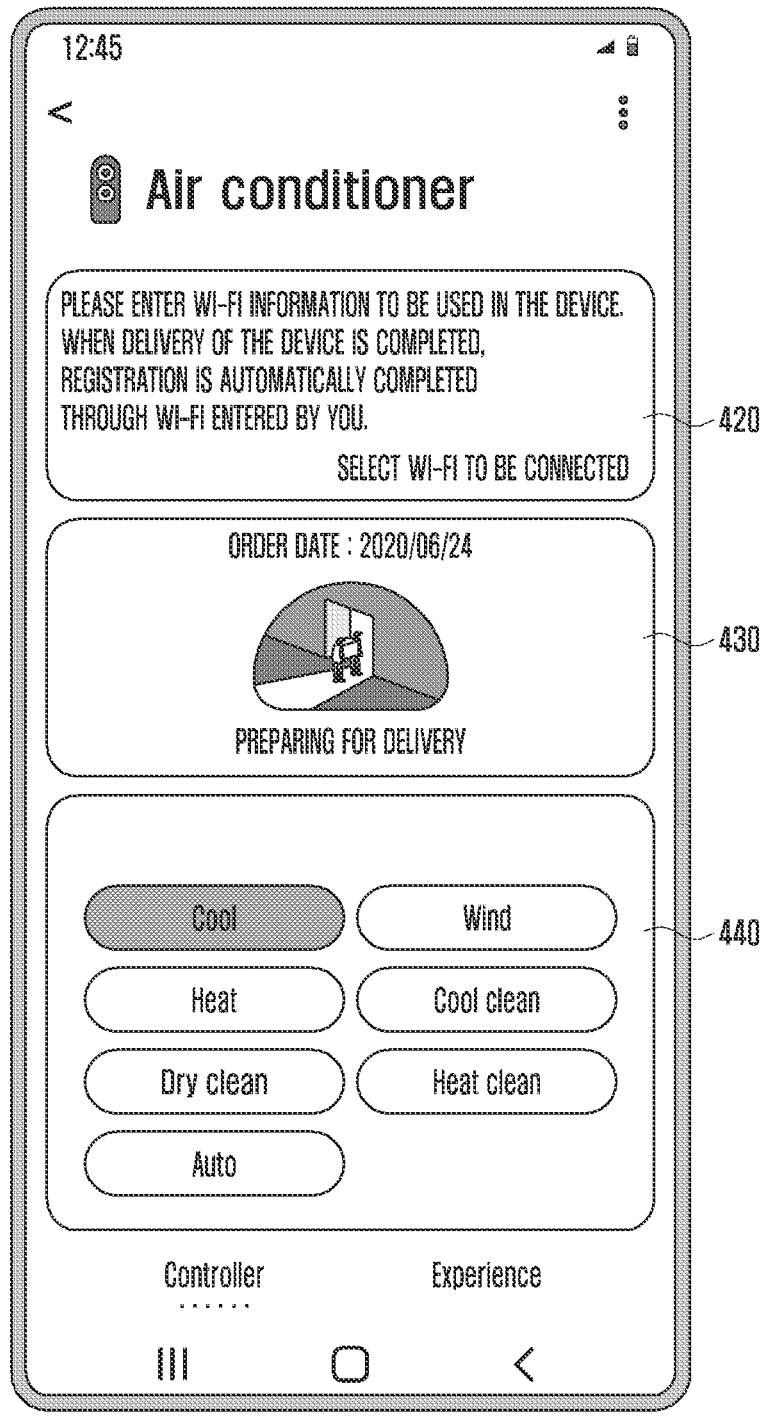
FIG. 4C illustrates a screen representing a delivery state of an external device according to an embodiment of the disclosure.

FIG. 4C illustrates a screen representing a delivery state of an external device according to an embodiment of the disclosure.

Referring to FIG. 4A, a processor (e.g., processor 310 of FIG. 3) may provide a first notification message 402 for the purchased external device. The first notification message 402 may be located at an upper end or a lower end of a screen 400 on a display (e.g., display 320 of FIG. 3), and may include a type of the purchased external device and a phrase (e.g., "Please experience an air conditioner in advance by pressing here.") for guiding a user's touch. The processor may receive device information from an IoT server (e.g., IoT server 200 of FIG. 2), and may generate the first notification message 402 based on the device information. The processor may generate a virtual device card 410 based on a user input for the first notification message 402.

Referring to FIG. 4B, the processor may display at least one virtual device card 410 on the display. According to various embodiments, the processor may provide simple information on the external device on the virtual device card 410, and change the configuration of the external device based on the user input. The virtual device card 410 may include a graphic object 412 indicating the external device and a phrase guiding a type and a delivery state of the external device. The virtual device card 410 may include a phrase and/or an icon representing the current state of the external device.

According to various embodiments of the disclosure, the processor may provide various kinds of information on the external device. For example, the processor may additionally display the location of the external device, login information, and a service provider. For example, the processor may display devices located in the living room in a bundle. According to another embodiment of the disclosure, the processor may configure the name of the external device based on the user input.

For example, if the user purchases a first external device and a second external device, and touches a notification message, the processor may provide a first virtual device card for the first external device and a second virtual device card for the second external device on the display. If the first external device is being delivered, the processor may display a state phrase, such as ready for shipment, being delivered, and delivery completed, on the first virtual device card depending on the delivery state of the first external device. If the delivery of the first external device and the second external device has been completed, the processor may separately display the respective external devices depending on the locations of the external devices. For example, if the first external device is located in the living room, and the second external device is located in the inner room, the processor may display devices located in the living room, including the first external device, as one group in a bundle, and display devices located in the inner room, including the second external device, as another group in a bundle.

The processor may change the disposition of the virtual device card 410 being provided on the display based on the user input. The processor may display only some of a plurality of external devices connected to the user device (e.g., electronic device 300 of FIG. 3) on the display. The user may configure to display only the external device being frequently used on the display. For example, among the first external device, the second external device, and the third external device connected to the user device, the user may frequently use only the first external device, and may not frequently use the second external device and the third external device. In this case, the processor may display only the virtual device card for the first external device on the display, and may not display the virtual device cards for the second external device and the third external device on the display based on the user input.

Referring to FIG. 4C, the processor may display the delivery state of the external device on the virtual device card 410. The processor may provide information on the delivery state, such as ready for shipment, being delivered, and delivery completed, on the virtual device card 410. The processor may receive the delivery information from the IoT server, and provide a delivery state menu 430 for identifying the delivery information. The delivery state menu 430 may include at least one of an order date on which the user ordered the external device and a phrase for the delivery state.

The processor may provide a Wi-Fi configuration menu 420 for proceeding with the configuration of Wi-Fi to which the external device is connectable. The user may input an SSID and a password of the Wi-Fi connectable in a use environment by touching the Wi-Fi configuration menu 420. After the delivery of the external device is completed, the processor may provide Wi-Fi information so that the external device becomes accessible to the Wi-Fi even without any user's separate input.

The processor may provide a detailed configuration menu 440 for changing the configuration of the external device. The processor may determine a function that is configurable to the external device based on the external device information, and generate and provide a menu for changing the related configuration.

Figure 5:
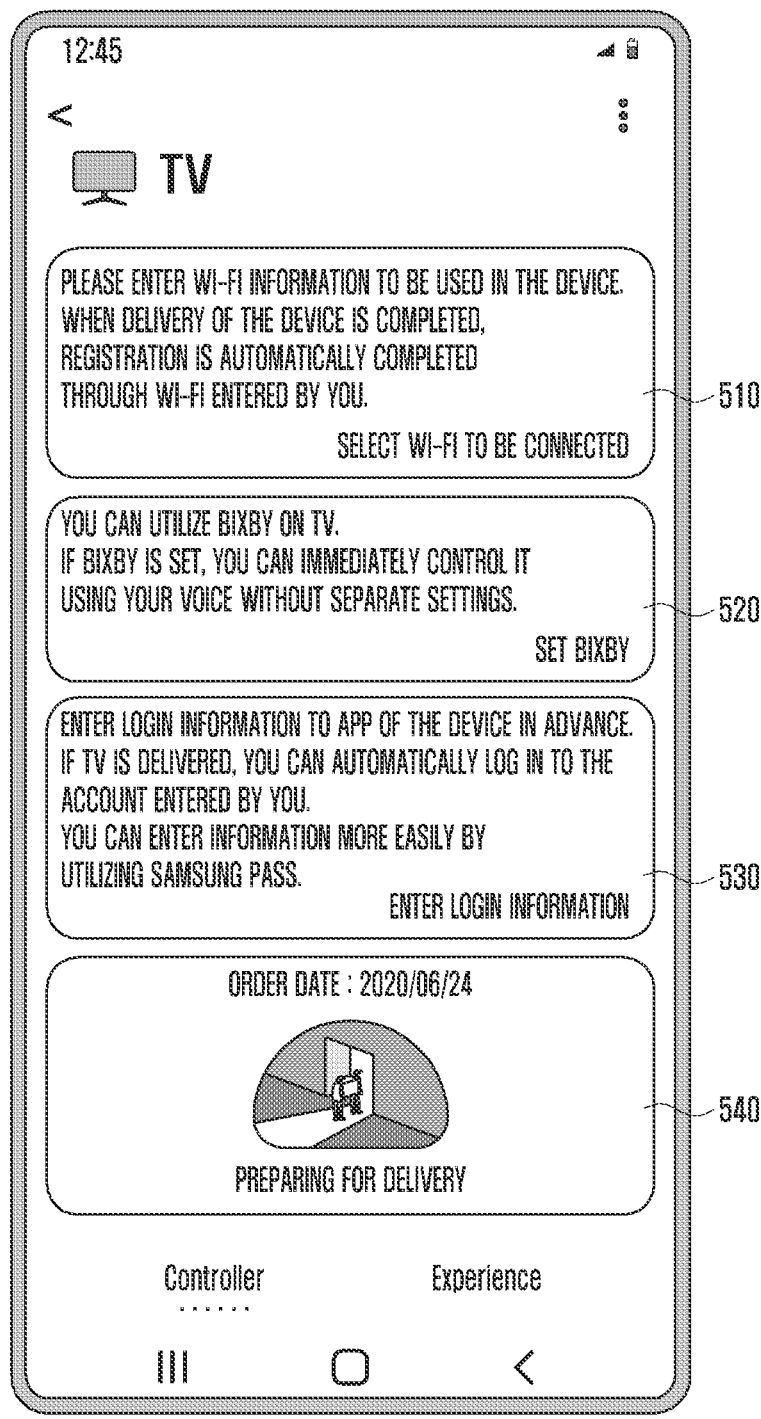
FIG. 5 illustrates a configuration change screen of an external device according to an embodiment of the disclosure.

FIG. 5 illustrates a configuration change screen of an external device according to an embodiment of the disclosure.

Referring to FIG. 5, the processor (e.g., processor 310 of FIG. 3) may provide a menu on a screen 500 for changing the configuration of the external device. The processor may configure the Wi-Fi to which the external device is connectable on a Wi-Fi configuration menu 510, and filter and provide Wi-Fi information that fits the specification of the external device. For example, the processor may filter the first Wi-Fi that is not supported by the external device among the first to third Wi-Fi existing in the use environment of the external device based on the external device information. The first Wi-Fi may provide a communication network of a frequency band that is different from the frequency band supported by the external device. Thereafter, the processor may provide an SSID and password input screen for the second Wi-Fi and the third Wi-Fi. The processor may select the Wi-Fi to be used for network connection of the external device between the second Wi-Fi and the third Wi-Fi based on the user input.

The processor may configure login information of the external device on a login information menu 530 based on the user input. The login information may be information necessary for execution of at least one application that may be installed in the external device. The processor may obtain the login information necessary for execution of at least one application based on the user input. For example, the user may separately input first login information necessary for execution of a first application and second login formation necessary for execution of a second application.

The processor may proceed with the configuration of the external device with a voice on a voice configuration menu 520. The processor may proceed with the configuration of the external device by collecting and analyzing user's voice data using a microphone. For example, in case of configuring the login information, the user may configure the login information by speaking a target application, a login ID, and a password in turn. The processor may output a voice message guiding user's voice configuration (e.g., "Please speak an ID and a password of the first application in turn.").

The processor may guide the delivery state of the external device on a delivery state menu 540. The processor may identify the delivery state of the external device with reference to the delivery information. For example, if the external device is preparing for delivery, a first guide phrase (e.g., preparing for delivery) may be displayed, whereas if the delivery of the external device has been completed, a second guide phrase (e.g., delivery completed) may be displayed.

The processor may proceed with the detailed configuration of the external device on a detailed configuration menu (e.g., detailed configuration menu 440 of FIG. 4C). The processor may change the configuration of the detailed configuration menu according to the external device information. For example, in case that the external device is an air conditioner, a menu for selecting at least one of a temperature, rotation, and cooling mode may be provided. In case that the external device is an air cleaner, a menu for selecting at least one of cleanliness, temperature, and humidity may be provided.

An electronic device according to various embodiments of the disclosure may include: a display; a communication module; a memory; and a processor operatively connected to the display, the communication module, and the memory. The processor is configured to: receive external device information by establishing a communication connection with a server using the communication module, display a graphic object indicating an external device corresponding to the received external device information on the display, provide a configuration UI capable of changing configuration information of the external device based on a user input for the graphic object, store the changed configuration information of the external device based on a user input for the configuration UI, obtain a plurality of pieces of device information by searching the external device, establish the communication connection by selecting the device corresponding to the external device information among the plurality of pieces of device information, and transmit the stored configuration information to the external device through the communication connection.

The processor may display a first notification message on the display in case that the external device information is received, and generate the graphic object based on a user input for the first notification message.

The graphic object may include at least one of a name of the external device, an icon indicating the external device, and a phrase indicating delivery information of the external device and whether to connect to the external device.

The configuration information may include information on at least one of an access point, a location, and a service provider.

The access point configuration may be a configuration on an SSID and a password of Wi-Fi being able to be used by the external device in a use environment of the external device.

The processor may obtain an ID based on the received external device information, and search an external device based on the obtained ID.

The processor may determine a service set identifier (SSID) of the external device by identifying at least one of a device type of the external device, a version, a manufacturer ID, and a serial number from the received external device information.

The processor may receive delivery information from the server, determine whether delivery of the external device has been completed based on the delivery information, determine whether the external device has the same SSID as the determined SSID through reception of a signal being broadcasted by the external device, and establish a communication connection in case that the external device has the same SSID.

The processor may determine whether the delivery of the external device has been completed based on the delivery information, display a second notification message on the display in case that the delivery of the external device has been completed, provide the configuration UI of the external device based on a user input for the second notification message, and store the changed configuration information based on the user input for the configuration UI.

The processor may download a UI object necessary for a registration menu for registering the external device in the electronic device based on the external device information.

The processor may identify at least one access point provided to a use environment of the external device, select an access point of a frequency band supported by the external device based on the received external device information, and provide a menu screen capable of accessing the selected access point.

The processor may update the server with the configuration information of the external device.

A server to register information of an external device using device information according to various embodiments may include: a communication module; a memory; and a processor operatively connected to the communication module and the memory. The processor is configured to: obtain purchaser's account information, external device information, and delivery information, establish a communication connection with a user device using the account information, transmit the external device information and the delivery information to the user device, and receive configuration information of the external device from the user device and store the configuration information in the memory.

Figure 6:
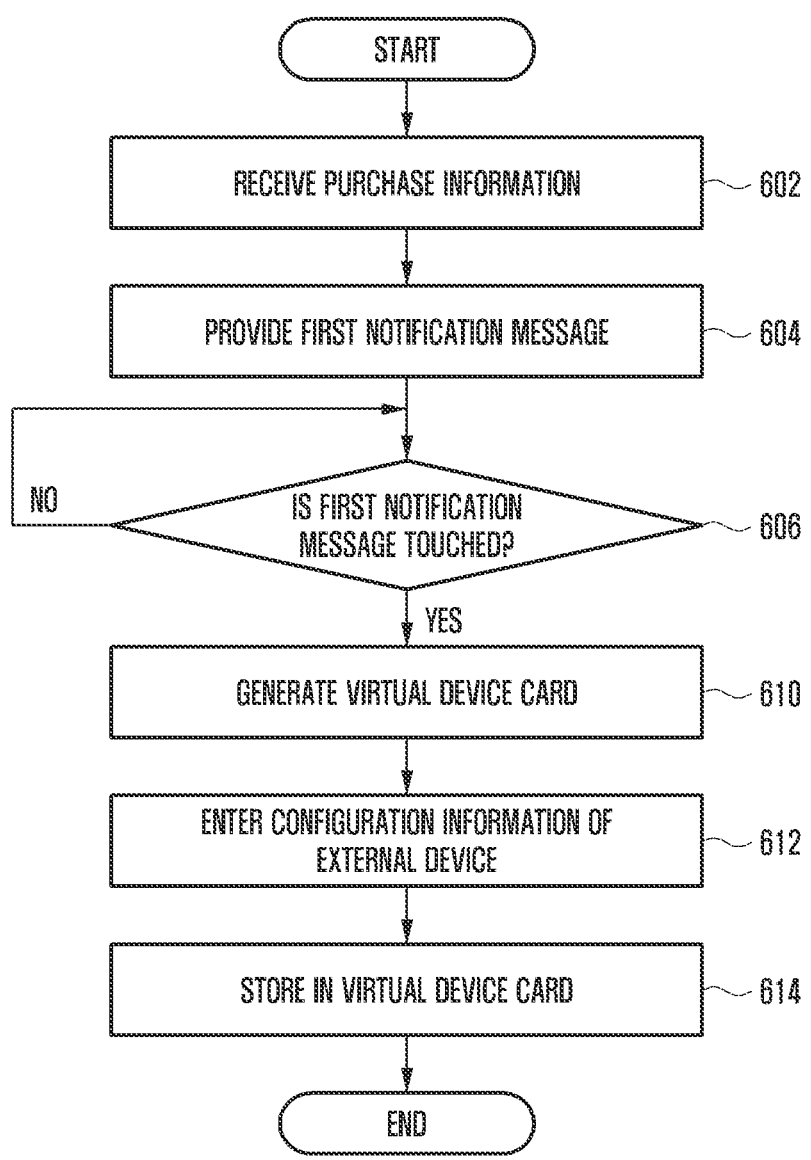
FIG. 6 is a flowchart of a method in which an electronic device stores external device information in a virtual device card according to an embodiment of the disclosure.

FIG. 6 is a flowchart of a method in which an electronic device stores external device information in a virtual device card according to an embodiment of the disclosure.

Referring to FIG. 6, at operation 602, the electronic device may receive transaction information from the IoT server (e.g., IoT server 200 of FIG. 2). The transaction information may include at least one of external device information, delivery information, purchaser's name, phone number, and account information. The external device information may include unique information (e.g., SSID) for identifying the external device. The IoT server may receive the transaction information from the purchase server (e.g., purchase server 212 of FIG. 2), and may transmit the transaction information to the user device.

At operation 604, the electronic device may provide the first notification message. The electronic device may receive the transaction information from the IoT server, and may configure the first notification message based on the received transaction information. The first notification message may include the phrase for guiding the type of the external device and the user input.

At operation 606, the electronic device may receive the user input for the first notification message. The electronic device may generate the virtual device card through reception of the user input for the first notification message. The first notification message may be displayed at the upper end of the display (e.g., display 320 of FIG. 3).

At operation 610, the electronic device may generate the virtual device card in response to the user input for the first notification message. The electronic device may display the generated virtual device card on the display. The virtual device card may include at least one of a graphic object indicating the external device and a phrase guiding a type and a delivery state of the external device. The electronic device may separately display an external device being delivered and an external device of which the delivery has been completed. For example, at an upper end of the display, an external device being delivered may be displayed, and at a lower end thereof, an external device, of which the delivery and the registration in the IoT server have been completed, and which is currently in use, may be displayed. The electronic device may change the delivery information that is expressed on the virtual device card depending on the delivery state of the external device. The virtual device card may include a phrase and/or an icon representing the current delivery state and the configuration state of the external device.

The electronic device may change the disposition of the virtual device card being provided on the display based on the user input. The electronic device may display only some of a plurality of external devices connected to the user device on the display. The user may configure to display only the external device being frequently used on the display.

The electronic device may operate the external device based on the user input for the virtual device card. After the delivery of the external device is completed, the electronic device may additionally provide buttons for performing additional functions, such as a power button, a mute button, a Wi-Fi button, and a screen brightness button. The electronic device may perform determined functions based on the user input for the respective buttons. The user may control the volume and the screen brightness by touching the buttons of the display of the user device. Further, the power button may be provided at an upper right end of the virtual device card, and the power of each of the devices may be turned on/off based on the user input for the power button.

At operation 612, the electronic device may change the configuration information of the external device. The electronic device may provide various configuration functions necessary for the operation of the external device. The user may configure functions that should be directly configured by the user among the functions being executed in the device on the virtual devices. For example, the configuration of the external device may include configurations of an access point (AP) and a service set identifier (SSID) of the Wi-Fi connectable to the external device, terms and conditions, and a location and a service provider of the external device based on the user input. The electronic device may provide a window for changing the configuration of each virtual device card on a separate screen, and may change the configuration based on the user input. The electronic device may filter the Wi-Fi supported by the external device based on the external device information.

The electronic device may display the delivery state of the external device on the virtual device card. The electronic device may provide information on the delivery state, such as ready for shipment, preparation for delivery, and delivery completed, on the virtual device card. The electronic device may receive the delivery information from the IoT server, and provide a menu for identifying the delivery information. The delivery menu may include at least one of an order date on which the user ordered the external device and a phrase for the delivery state.

The electronic device may provide a Wi-Fi menu for proceeding with the configuration of the Wi-Fi to which the external device is connectable. The user may input an SSID and a password of the Wi-Fi connectable in a use environment by touching the Wi-Fi menu. After the delivery of the external device is completed, the electronic device may provide Wi-Fi information so that the external device becomes accessible to the Wi-Fi even without any user's separate input.

The electronic device may provide a configuration change menu for changing the configuration of the external device. According to an embodiment, the electronic device may determine a function that is configurable to the external device based on the external device information, and generate and provide a menu for changing the related configuration.

The electronic device may provide a menu for changing the configuration of the external device. The electronic device may configure Wi-Fi to which the external device is connectable on a Wi-Fi configuration menu, and filter and provide Wi-Fi information that fits the specification of the external device.

The electronic device may configure login information of the external device on a login information menu based on the user input. The login information may be information necessary for execution of at least one application that may be installed in the external device. The electronic device may obtain the login information necessary for execution of at least one application based on the user input.

The electronic device may guide the delivery state of the external device on a delivery state menu. The electronic device may identify the delivery state of the external device with reference to the delivery information. For example, if the external device is preparing for delivery, a first guide phrase (e.g., preparing for delivery) may be displayed, whereas if the delivery of the external device has been completed, a second guide phrase (e.g., delivery completed) may be displayed.

The electronic device may proceed with the detailed configuration of the external device on a detailed configuration menu. The electronic device may change the configuration of the detailed configuration menu according to the external device information.

The electronic device may change the configuration of the external device based on a user's voice data. The electronic device may receive the user's voice data, and change the received voice data to text data using a speech to text (STT) function. The electronic device may change the configuration of the external device by analyzing the changed data.

At operation 614, the electronic device may store the configuration information of the external device on the virtual device card.

Figure 7:
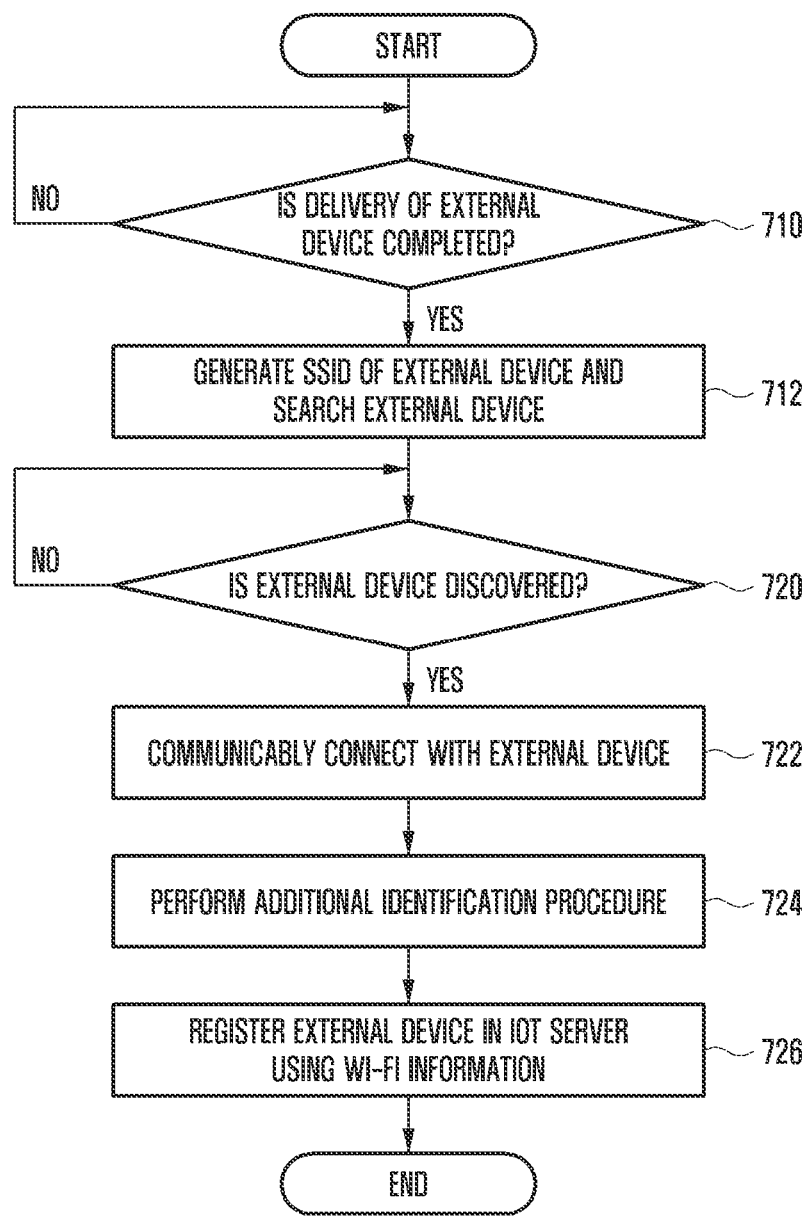
FIG. 7 is a flowchart of a method in which an electronic device establishes a communication connection with an external device according to an embodiment of the disclosure.

FIG. 7 is a flowchart of a method in which an electronic device establishes a communication connection with an external device according to an embodiment of the disclosure.

Referring to FIG. 7, at operation 710, the electronic device may identify whether delivery of the external device has been completed. The electronic device may receive the delivery information on the delivery state of the external device from the external server (e.g., external server 210 of FIG. 2). The electronic device may identify the delivery state, and change the phrase of the virtual device card to suit the delivery state of the external device. The electronic device may identify whether the delivery of the external device has been completed by identifying the delivery information.

At operation 712, the electronic device may generate the SSID of the external device, and search the external device. The electronic device may generate the SSID based on the external device information received from the external server. The electronic device may generate the SSID based on at least one of a type, a version, a manufacturer, and a serial number of the external device. The electronic device may generate the SSID based on the external device information in a similar process to the process in which the delivery server (e.g., delivery server 216 of FIG. 2) generates the SSID.

At operation 720, the electronic device may search the external device having the same SSID as the generated SSID. At the time of shipment of the external device, the delivery server may generate the SSID of the external device based on the external device information, and input the SSID to the external device. The external device may continuously broadcast a signal including a unique SSID. The electronic device may receive the signal being broadcasted by the external device, and identify whether the unique SSID coincides with the generated SSID. If the electronic device finds the external device having the SSID that coincides with the generated SSID, it may establish the communication connection with the corresponding external device.

The electronic device may search a surrounding external device by the SSID. The external devices may have their unique SSIDs, and may broadcast signals including the unique SSIDs. The electronic device may receive the signals being broadcasted from a plurality of devices, and may search the signal including the same information as the generated SSID based on the external device information. If the electronic device finds the signal having the same SSID, it may establish the communication connection with the external device without any separate user input.

At operation 722, the electronic device may establish the communication connection with the external device. The electronic device may generate the SSID using the unique information included in the external device information received from the external device. The unique information may include a unique identifier, such as a serial number of the external device or a MAC address. The delivery server may generate the SSID of the external device based on the unique information. The process in which the electronic device generates the SSID of the external device based on the external device information may be similar to the process in which the delivery server generates the SSID. For example, the delivery server may generate the SSID by combining the serial number of the external device and the MAC address with each other. The electronic device may generate the SSID by combining the serial number of the external device and the MAC address with each other based on the transaction information obtained from the IoT server (e.g., IoT server 200 of FIG. 2). The electronic device may establish the communication connection by finding the external device having the same SSID using the generated SSID.

At operation 724, the electronic device may perform an additional identification procedure. If a plurality of external devices are present around the user device, the electronic device may perform the additional identification procedure in order to identify the external device purchased by the user. The electronic device may identify the external device through comparison of the generated SSID with the plurality of devices, and may establish the communication connection with the external device of which the additional identification procedure has been completed.

The electronic device may download a resource necessary for configuration of the external device from the IoT server based on the external device information. The IoT server may store resources necessary for registration of various external devices, and may transmit a suitable resource in response to a request from the user device. The electronic device may determine which resource is necessary for the registration of the device, and may request the IoT server to transmit the corresponding resource. At least parts of the resources may differ depending on the type of the external device.

At operation 726, the electronic device may register the external device in the IoT server using the Wi-Fi information. The electronic device may access the IoT server based on the Wi-Fi information input by the user, and may register the external device. According to an embodiment, the electronic device may update the changed configuration information of the external device.

A method for registering an external device using device information according to various embodiments may include: receiving external device information by establishing a communication connection with a server using a communication module; generating and displaying a graphic object indicating an external device corresponding to the received external device information on a display; providing a configuration UI capable of changing configuration information of the external device based on a user input for the graphic object; storing the changed configuration information of the external device based on a user input for the configuration UI; obtaining a plurality of pieces of device information by searching the external device; establishing the communication connection by selecting the device corresponding to the external device information among the plurality of pieces of device information; and transmitting the stored configuration information to the external device through the communication connection.

The generating and displaying the graphic object on the display may further include: displaying a first notification message on the display in case that the external device information is received; and generating the graphic object based on a user input for the first notification message.

The graphic object may include at least one of a name of the external device, an icon indicating the external device, and a phrase indicating delivery information of the external device and whether to connect to the external device.

The method may further include determining an SSID of the external device using the received external device information.

Establishing the communication connection may further include: receiving delivery information from the server; determining whether delivery of the external device has been completed based on the delivery information; determining whether the external device has the same SSID as the determined SSID through reception of a signal being broadcasted by the external device; and establishing a communication connection in case that the external device has the same SSID.

Changing the configuration of the external device may further include: determining whether the delivery of the external device has been completed based on the delivery information; displaying a second notification message on the display in case that the delivery of the external device has been completed; providing the configuration UI of the external device based on a user input for the second notification message; and storing the changed configuration information based on the user input for the configuration UI.

Establishing the communication connection may further include: identifying at least one access point provided to a use environment of the external device; selecting an access point of a frequency band supported by the external device based on the received external device information; and providing a menu screen capable of accessing the selected access point.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
communication circuitry;
memory, comprising one or more storage media, storing instructions; and
one or more processors communicatively coupled to the display, the communication circuitry, and the memory,
wherein the instructions, when executed by the one or more processors individually or collectively, cause the electronic device to:
receive transaction information including delivery information indicating a delivery state of an external device and external device information by establishing a first communication connection with a server using the communication circuitry, the external device information including unique information for identifying the external device,
display a graphic object indicating an external device corresponding to the external device information on the display, the graphic object indicating the delivery state of the external device based on the delivery information,
provide a configuration user interface (UI) capable of changing configuration information of the external device based on a user input for the graphic object,
store the changed configuration information of the external device based on a user input for the configuration UI,
obtain a plurality of device information by searching the external device,
establish a second communication connection with the external device by selecting the external device corresponding to the external device information among the plurality of device information, and
transmit the stored configuration information to the external device through the second communication connection.

2. The electronic device of claim 1, wherein the instructions, when executed by the one or more processors individually or collectively, further cause the electronic device to:
display a first notification message on the display in case that the external device information is received; and
generate the graphic object based on a user input for the first notification message.

3. The electronic device of claim 1, wherein the graphic object comprises at least one of a name of the external device, an icon indicating the external device, and whether to connect to the external device.

4. The electronic device of claim 1, wherein the configuration information comprises information on at least one of an access point, a location, and a service provider.

5. The electronic device of claim 4, wherein the access point configuration is a configuration on a service set identifier (SSID) and a password of Wi-Fi being able to be used by the external device in a use environment of the external device.

6. The electronic device of claim 1, wherein the instructions, when executed by the one or more processors individually or collectively, further cause the electronic device to:
obtain an identifier (ID) based on the external device information; and
search for the external device based on the obtained ID.

7. The electronic device of claim 1, wherein the instructions, when executed by the one or more processors individually or collectively, further cause the electronic device to determine a service set identifier (SSID) of the external device by identifying at least one of a device type of the external device, a version, a manufacturer ID, and a serial number from the external device information.

8. The electronic device of claim 7, wherein the instructions, when executed by the one or more processors individually or collectively, further cause the electronic device to:
determine whether delivery of the external device has been completed based on the delivery information;
determine whether the external device has the same SSID as the determined SSID through reception of a signal being broadcasted by the external device; and
establish the second communication connection in case that the external device has the same SSID.

9. The electronic device of claim 8, wherein the instructions, when executed by the one or more processors individually or collectively, further cause the electronic device to:
determine whether the delivery of the external device has been completed based on the delivery information;
display a second notification message on the display in case that the delivery of the external device has been completed;
provide the configuration UI of the external device based on a user input for the second notification message; and
store the changed configuration information based on the user input for the configuration UI.

10. The electronic device of claim 1, wherein the instructions, when executed by the one or more processors individually or collectively, further cause the electronic device to download a UI object necessary for a registration menu for registering the external device in the electronic device based on the external device information.

11. The electronic device of claim 1, wherein the instructions, when executed by the one or more processors individually or collectively, further cause the electronic device to:
identify at least one access point provided to a use environment of the external device;
select an access point of a frequency band supported by the external device based on the external device information; and
provide a menu screen capable of accessing the selected access point.

12. The electronic device of claim 1, wherein the instructions, when executed by the one or more processors individually or collectively, further cause the electronic device to update the server with the configuration information of the external device.

13. A method for registering an external device using device information, the method comprising:
   receiving transaction information including delivery information indicating a delivery state of an external device and external device information by establishing a first communication connection with a server using communication circuitry, the external device information including unique information for identifying the external device;
   generating and displaying a graphic object indicating an external device corresponding to the received external device information on a display, the graphic object indicating the delivery state of the external device based on the delivery information;
   providing a configuration UI capable of changing configuration information of the external device based on a user input for the graphic object;
   storing the changed configuration information of the external device based on a user input for the configuration UI;
   obtaining a plurality of device information by searching the external device;
   establishing a second communication connection with the external device by selecting the external device corresponding to the external device information among the plurality of device information; and
   transmitting the stored configuration information to the external device through the second communication connection.

14. The method of claim 13, wherein the generating and displaying of the graphic object on the display further comprises:
   displaying a first notification message on the display in case that the external device information is received; and
   generating the graphic object based on a user input for the first notification message.

15. The method of claim 13, wherein the graphic object comprises at least one of a name of the external device, an icon indicating the external device, and a phrase indicating delivery information of the external device and whether to connect to the external device.

16. The method of claim 13, further comprising:
   determining an SSID of the external device using the received external device information.

17. The method of claim 16, wherein the establishing of the second communication connection further comprises:
   determining whether delivery of the external device has been completed based on the delivery information;
   determining whether the external device has the same SSID as the determined SSID through reception of a signal being broadcasted by the external device; and
   establishing the second communication connection in case that the external device has the same SSID.

18. The method of claim 17, wherein the changing of the configuration of the external device further comprises:
   determining whether the delivery of the external device has been completed based on the delivery information;
   displaying a second notification message on the display in case that the delivery of the external device has been completed;
   providing the configuration UI of the external device based on a user input for the second notification message; and
   storing the changed configuration information based on the user input for the configuration UI.

19. The method of claim 13, wherein the establishing of the second communication connection further comprises:
   identifying at least one access point provided to a use environment of the external device;
   selecting an access point of a frequency band supported by the external device based on the received external device information; and
   providing a menu screen capable of accessing the selected access point.

20. An electronic device comprising:
   a display;
   communication circuitry;
   memory, comprising one or more storage media, storing instructions; and
   one or more processors communicatively coupled to the display, the communication circuitry, and the memory,
   wherein the instructions, when executed by the one or more processors individually or collectively, cause the electronic device to:
      receive delivery information and external device information by establishing a first communication connection with a server using the communication circuitry, the delivery information including a delivery state of an external device,
      display a graphic object indicating the external device corresponding to the external device information on the display, the graphic object indicating the delivery state of the external device based on the delivery information,
      provide a configuration user interface (UI) capable of changing configuration information of the external device based on a user input for the graphic object,
      store the changed configuration information of the external device based on a user input for the configuration UI,
      based on determining the delivery of the external device has been completed, establish a second communication connection with the external device corresponding to the external device information, and
      transmit the stored configuration information to the external device through the second communication connection.

* * * * *